United States Patent
Pessolano

(10) Patent No.: US 7,536,578 B2
(45) Date of Patent: May 19, 2009

(54) METHOD AND APPARATUS FOR OVER CLOCKING IN A DIGITAL PROCESSING SYSTEM

(75) Inventor: Francesco Pessolano, Eindhoven (NL)

(73) Assignee: NXP B.V., Eindhoven (NL)

( * ) Notice: Subject to any disclaimer, the term of this patent is extended or adjusted under 35 U.S.C. 154(b) by 312 days.

(21) Appl. No.: 10/587,607

(22) PCT Filed: Jan. 20, 2005

(86) PCT No.: PCT/IB2005/050234

§ 371 (c)(1),
(2), (4) Date: Jul. 27, 2006

(87) PCT Pub. No.: WO2005/073828

PCT Pub. Date: Aug. 11, 2005

(65) Prior Publication Data

US 2007/0168686 A1    Jul. 19, 2007

(30) Foreign Application Priority Data

Jan. 28, 2004    (EP) ................................. 04100301

(51) Int. Cl.
G06F 1/00    (2006.01)
H04L 7/00    (2006.01)
G01R 35/00    (2006.01)

(52) U.S. Cl. ................... 713/500; 713/400; 702/106
(58) Field of Classification Search ............ 713/400, 713/500
See application file for complete search history.

(56) References Cited

U.S. PATENT DOCUMENTS

| | | | |
|---|---|---|---|
| 5,189,314 A | 2/1993 | Georgiou et al. | |
| 5,218,705 A * | 6/1993 | DeLuca et al. | 340/7.37 |
| 5,418,931 A | 5/1995 | Moorby | |
| 5,630,110 A | 5/1997 | Mote, Jr. | |
| 5,774,704 A | 6/1998 | Williams | |
| 6,014,033 A * | 1/2000 | Fitzgerald et al. | 324/765 |
| 6,076,171 A | 6/2000 | Kawata | |
| 6,208,182 B1 | 3/2001 | Marbot et al. | |
| 6,230,279 B1 | 5/2001 | Dewa et al. | |
| 6,324,657 B1 * | 11/2001 | Fister et al. | 714/42 |
| 6,535,986 B1 | 3/2003 | Rosno et al. | |
| 6,963,992 B1 * | 11/2005 | Cheng et al. | 713/501 |
| 7,043,649 B2 * | 5/2006 | Terrell, II | 713/322 |
| 7,382,366 B1 * | 6/2008 | Klock et al. | 345/213 |
| 2002/0116650 A1 | 8/2002 | Halepete et al. | |
| 2004/0105237 A1 * | 6/2004 | Hoover et al. | 361/711 |
| 2005/0265500 A1 * | 12/2005 | Miao | 375/354 |

FOREIGN PATENT DOCUMENTS

EP    0 722 137    7/1996

* cited by examiner

Primary Examiner—Thomas Lee
Assistant Examiner—Ji H Bae

(57) ABSTRACT

A method of determining a maximum optimum clock frequency at which a digital processing system can operate, the method comprising the steps of: generating a clock signal at an initial frequency; increasing said frequency in a step-wise manner and determining the operation of said system each of a selected number of frequencies, until a clock frequency is identified at which said processor does not operate correctly; and identifying a maximum clock frequency at which said system can operate correctly; characterized in that: said maximum clock frequency comprises the frequency immediately previous to the one identified as being one at which said system does not operate correctly; and in that a timing monitor is provided for determining whether or not said system can operate within system timing constraints at each frequency, thereby indicating whether or not said system operates correctly at the respective frequency.

7 Claims, 4 Drawing Sheets

METHOD AND APPARATUS FOR OVER CLOCKING IN A DIGITAL PROCESSING SYSTEM

This invention relates to a method and apparatus for over clocking in a digital processing system and, more particularly, to a method and apparatus for enabling digital processing systems, or parts thereof, to automatically overclock themselves within the limits of the process.

Digital processing systems rely on one or more clock signals as a time reference. A well known measure of the performance of a processor chip is the frequency at which the processor chip operates. Processor chips which operate at a higher clock frequency are capable of processing more information in a shorter time than equivalent processor chips which operate at a lower clock frequency. Thus, it is desirable to run a processor chip at the maximum clock frequency which that particular processor chip can operate without causing the processor to operate incorrectly due to internal delays, thermal destruction of the processor, or degradation of performance due to thermally induced automatic shutdown.

The period of the clock signals with reference to which a processor is intended to operate is determined at the time of design of the processor, taking into consideration the worst possible situation in terms of technology process. As a result, in many cases, processor chips are implemented within a computer system to operate at a clock frequency which is significantly lower than the maximum operational frequency that the processor can sustain without exhibiting the above-mentioned failures or protective shutdown. This may happen for many reasons. For example, because the processor chips are typically categorized into two or three processing speed categories, many processor chips which are actually capable of running at higher clock rates than the standard clock rate categories are simply set to a lower clock rate in order to conform to the clock rate category for a particular computer. This is known as 'binning' and, as a result, after fabrication, the situation may arise whereby the system could run at much higher frequencies than anticipated by the clock rate originally set.

A disadvantage of binning is that it is very expensive and static, i.e. the system always runs at the maximum (set) frequency, and therefore the maximum energy consumption.

Further, in electronic systems with an embedded clock generation unit based on ring oscillators, a calibration step is required at start-up in order to tune the oscillator to the working condition and the process in which the design has been realized. In accordance with the prior art, this calibration can be done on-line every time the chip is powered up. Another approach is to perform the calibration once, and then retrieve the calibration information from an off-chip non-volatile memory every time the system is powered up. However, in the former case, calibration is needed every time the system is powered up, whereas in the latter case, calibration is static and does not take into account silicon ageing or variable working conditions.

In accordance with a first aspect of the present invention, there is provided a method of determining a maximum optimum clock frequency at which a digital processing system can operate, the method comprising the steps of:

generating a clock signal at an initial frequency;

increasing said frequency in a step-wise manner and determining the operation of said system each of a selected number of frequencies, until a clock frequency is identified at which said processor does not operate correctly; and identifying a maximum clock frequency at which said system can operate correctly; characterized in that:

said maximum clock frequency comprises the frequency immediately previous to the one identified as being one at which said system does not operate correctly; and in that a timing monitor is provided for determining whether or not said system can operate within system timing constraints at each frequency, thereby indicating whether or not said system operates correctly at the respective frequency.

The present invention further extends to apparatus for determining a maximum optimum clock frequency at which a digital processing system can operate, the apparatus comprising:

means for generating a clock signal at an initial frequency;

means for increasing said frequency in a step-wise manner and means for determining the operation of said system each of a selected number of frequencies, until a clock frequency is identified at which said processor does not operate correctly; and means for identifying a maximum clock frequency at which said system can operate correctly; characterized in that:

said maximum clock frequency comprises the frequency immediately previous to the one identified as being one at which said system does not operate correctly; and in that said means for determining the operation of said system comprises a timing monitor for determining whether or not said system can operate within system timing constraints at each frequency, thereby indicating whether or not said system operates correctly at the respective frequency.

In a preferred embodiment, the maximum frequency is stored in a memory.

In accordance with one embodiment of the invention, the above-mentioned method is performed periodically, and the output frequency is used to calibrate the clock generation means.

In one embodiment, the method defined above is used in respect of a method of selectively changing the frequency at which a digital processing system is operating.

Thus, in accordance with a second aspect of the present invention, there is provided a method of selectively changing the frequency at which a digital processing system is operating, the method comprising:

a) determining, when said system is reset, a maximum clock frequency at which said system can operate within system timing constraints, and storing said maximum frequency;

b) generating, after reset, a clock signal at a nominal frequency, less than said maximum frequency, until a signal is received indicating that an increased clock frequency is required;

c) generating, in response to receipt of said signal, a clock signal at said maximum frequency for a required time; and then d) once again generating a clock frequency at said nominal frequency.

In a preferred embodiment of the invention, the step of determining the maximum frequency comprises generating a clock signal at an initial frequency, increasing the frequency of said clock signal, preferably in a step-wise manner, and monitoring system timing constraints at each selected frequency until it is determined that the timing constraints of the system are not met, and storing the last frequency at which the system timing constraints were met as said maximum frequency.

The invention further extends to apparatus for selectively changing the frequency at which a digital processing system is operating, the apparatus comprising:

i. programmable clock generation means;
ii. means for determining, when said system is reset, a maximum clock frequency at which said system can operate within system timing constraints, and storing said maximum frequency; and
iii. means for causing said clock generation means to:

a) generate, after reset, a clock signal at a nominal frequency, less than said maximum frequency, until a signal is received indicating that an increased clock frequency is required;

b) generate, in response to receipt of said signal, a clock signal at said maximum frequency for a required time; and then c) once again generate a clock frequency at said nominal frequency.

The apparatus beneficially comprises a timing monitor for monitoring system timing constraints. In a preferred embodiment, the apparatus comprises a frequency finder for increasing the frequency of the clock signal from the initial frequency to the maximum frequency at reset. The clock generation means may comprise a programmable ring oscillator.

In one exemplary embodiment, the apparatus comprises a frequency finder and selector for determining the maximum frequency at reset, receiving a request for an increase in clock frequency and causing the clock generation means to generate a clock signal at the maximum frequency until the request expires or is withdrawn.

In an alternative exemplary embodiment, the apparatus comprises a frequency finder for determining said maximum frequency at reset and causing said clock generation means to generate a clock signal at said maximum frequency, second clock generation means arranged and configured to generate a clock signal at said nominal frequency, the outputs of the first and second clock generation means being coupled to a clock output by switch means, said switch means being arranged to couple the output of said second clock generation means to said clock output until a request to increase said clock frequency is received, in response to which, said switch means causes the output of said first clock generation means to be coupled to said clock output, until said request expires or is withdrawn.

Means may be provided for disabling the first clock generation means when the request expires or is withdrawn. The second clock generation means may comprise an external clock generation means.

These and other aspects of the present invention will be apparent from, and elucidated with reference to, the embodiments described hereinafter.

Embodiments of the present invention will now be described by way of examples only and with reference to the accompanying drawings, in which.

Figure 1:
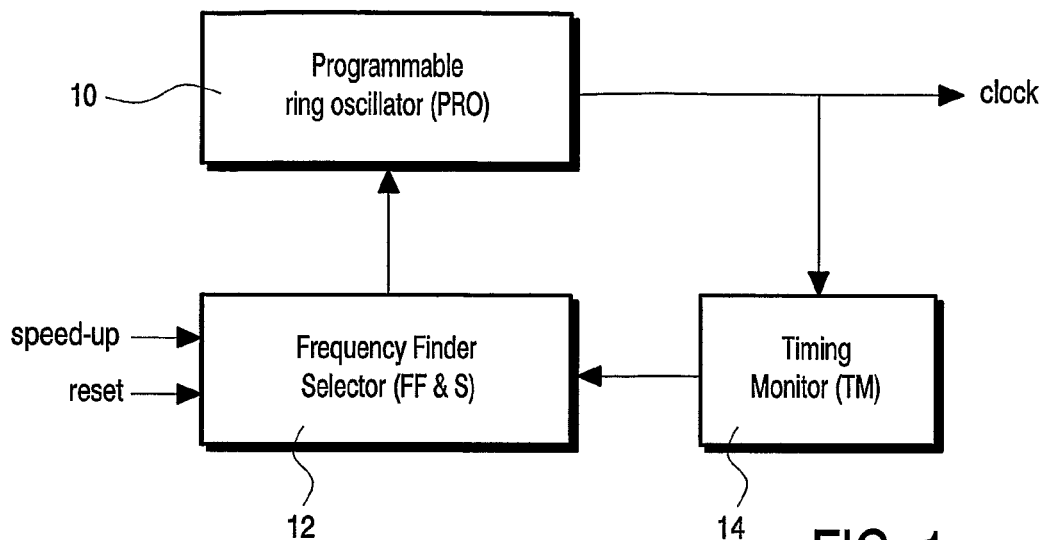
FIG. 1 is a schematic block diagram illustrating apparatus according to a first exemplary embodiment of the present invention.

Thus, an aspect of the present invention provides a mechanism that allows a system, or parts of it, to overclock themselves within the limits of the process. The invention detects the process corner at which the system (or parts of it) have been fabricated so as to determine the maximum frequency at which the system itself could run. At this point, the invention allows the system to overclock itself at such a frequency every time this is permitted and beneficial to the operation of the system.

U.S. Pat. No. 5,630,110 describes a method and apparatus for enhancing processor performance, comprising applying a supply voltage having a specified maximum voltage level, and then setting the clock rate to an initial frequency. Next, it is determined whether or not the processor is operating properly at this initial frequency. If not, then the frequency is reduced in a step-wise manner until it reaches a level at which it is determined that the processor is operating correctly. If, however, it is determined that the processor is operating correctly at the initial frequency, then the frequency is increased until a maximum rate is found at which the processor operates correctly.

U.S. Pat. No. 6,076,171 describes apparatus for controlling the power consumption of an information processing system, by varying the system clock frequency. The CPU power currently required by a user is detected directly by detection means and, based on the detection result, the system clock frequency is dynamically changed so that the CPU power offered falls within a predetermined proper range.

U.S. Patent Application No. 2002/0116650 A1 describes a method for controlling the power used by a computer, including the steps of measuring the operating characteristics of the central processor of the computer, determining when the operating characteristics of the central processor are significantly different than that required by the operations being conducted, and changing the operating characteristics of the central processor to a level commensurate with the operations being conducted. For example, if the processor is operating at a so-called core frequency and normal voltage, and it is determined that the processor is spending more than a preselected increment of its operation in one or more idle modes, then power is being wasted and the operating frequency and voltage may be reduced. On the other hand, it may be determined that the processor is operating at a frequency and voltage which is too low, in the sense that the processing power is too low to handle a series of commands which have been furnished for execution by the processor, in which case, the voltage and frequency may be increased accordingly.

U.S. Pat. No. 5,774,704 describes a computer system including a device for dynamic central processor clock adjustment. A controller adjusts the clock frequency such that it increases when the load on the CPU increases, and decreases when the load on the CPU decreases.

U.S. Pat. No. 5,189,314 describes an integrated circuit, wherein when the chip is idle, the clock frequency is decreased to reduce heat generation. The heat "saved" while the chip is idling is available for use later to increase the clock rate above normal, provided that the total heat generated does not exceed the heat-dissipation capacity of the IC package.

U.S. Pat. No. 6,230,279 describes a system and method for dynamically controlling the processing speed of a computer in response to user commands. When a user activates an acceleration or deceleration function, the processing speed of the computer is increased or decreased accordingly, and the resultant processing speed is recorded in a data base as speed management data in conjunction with the application program currently being executed. Thus, when that application is run again, the processing speed will be adapted according to the speed management data previously stored.

We have now devised an improved arrangement.

One aspect of the present invention is basically a way to use the fact that a system can run at higher frequencies automatically and only when it is deemed useful, by means of the following two steps:

At reset time, the system identifies its maximum allowed clock frequency (i.e. its process corner) and this frequency value is stored.

At run time (and only when it is deemed useful, for example, if the system is starving the output signals), the higher frequency is used; otherwise, the nominal frequency is used (for example, when the system is blocked by the output so it would not be desirable to increase processing speed, as this would increase traffic at the output).

In order to be able to detect the process corner and switch between frequencies, the system requires means to perform both of these actions, and two exemplary embodiments are presented below to illustrate how this may be accomplished.

Referring to FIG. 1 of the drawings, apparatus according to a first exemplary embodiment of the present invention comprises a programmable ring oscillator 10, a frequency finder and selector 12 and a timing monitor 14.

Ring oscillators are widely known in the field of integrated circuit manufacture and usually comprise simple inverting logic circuits as stages. The current output at each stage takes a certain time to charge and discharge an input capacitance of the following stage to a threshold voltage. The stages are connected in series to form a cascade loop, so that at a certain frequency a 180° phase shift is imparted to signals passing around the loop. Provided the loop gain is large enough, the signals soon become non-linear resulting in square-wave oscillations which can be used for a variety of purposes, in particular for digital signal processing. In metal-oxide (MOS) integrated circuits, ring oscillators are commonly used to drive charge pump circuits. In particular, ring oscillators are provided in BiCMOS or bipolar and also in pure CMOS circuits. A preferred application of ring oscillators is the provision in data and clock recovery circuits or in phase locked loop (PLL) circuits.

The programmable ring oscillator 10 used in this exemplary embodiment of the present invention includes a variable programmable delay element (not shown) which, is arranged and configured to receive data representative of a clock cycle of a clock signal required to be generated and, therefore, indicate what the new required frequency should be. Thus, the exemplary arrangement illustrated in FIG. 1 may replace the standard ring oscillator module in known processor systems.

Figure 2:
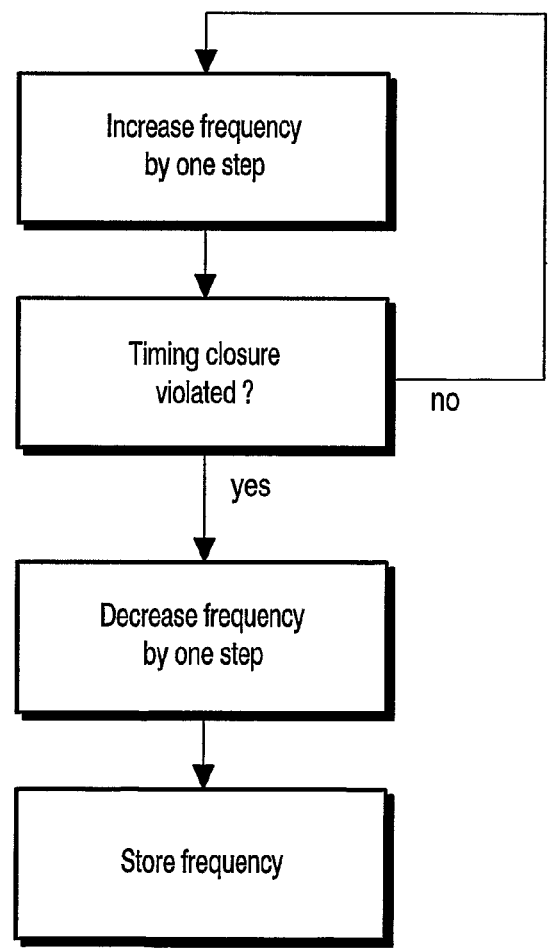
FIG. 2 is a schematic flow diagram illustrating the process flow of the apparatus of FIG. 1.

In use, and referring in addition to FIG. 2 of the drawings, at the time that the processing system is reset, the frequency finder and selector 12 programs the programmable ring oscillator 10 to generate a clock signal at a nominal frequency, at which it is assumed that all timing constraints are met, such that the timing monitor 14 signals to the frequency finder and selector 12 that no timing violations are possible. At this point, the frequency finder and selector 12 starts to increase the frequency in a step-wise manner (by repeatedly programming the programmable ring oscillator 10 accordingly), until the timing monitor 14 reports that the timing constraints are not met. Then, the frequency finder and selector 12 takes the immediately previous frequency, at which the timing monitor 14 did not determine that the system timing constraints were violated, and causes this frequency to be stored as the maximum possible running frequency of the system.

The frequency search described above is a linear search. However, different algorithms can be used (for example, bi-section) that can speed up the search process, and the invention is not intended to be limited in this regard.

It will be appreciated that a programmable ring oscillators are known in the art, and an example of this type of element is described and illustrated in U.S. Pat. No. 6,208,182. It will be appreciated by a person skilled in the art that several different types and construction of programmable ring oscillator would be suitable for use in the apparatus of the present invention, and the invention is not intended to be limited in this regard. The only constraint in respect of this element, with reference to the exemplary embodiment of the present invention illustrated in FIG. 1, is that it can produce a clock signal with a programmable frequency from the nominal frequency up to the maximum value, for example, equal to the fast process corner frequency.

Similarly, timing monitors are also known in the art. For example, a method and apparatus for detecting and reporting system timing constraint violations is described in U.S. Pat. No. 5,418,931. It will be appreciated by a person skilled in the art that a timing monitor suitable for use in the exemplary arrangement described with reference to FIG. 1 of the drawings needs only to detect if an input frequency violates the system timing constraints, and its actual construction is not intended to be limited to specific examples.

The frequency finder and selector 12 in the arrangement of FIG. 1 comprises the control logic for implementing the invention.

After reset, during run time, the frequency finder and selector 12 programs the ring oscillator so as to generate a clock signal at the nominal frequency, until a speed up signal is received by the frequency finder and selector 12, in response to which it programs the ring oscillator 10 to generate the clock signal at the maximum frequency (determined above) until the speed up request is withdrawn.

There are many different circumstances in which it may be required to increase the frequency of the clock signal. For example, one of the more common circumstances (in streaming systems) is that the output is starving (i.e. no output data is ready yet) while the inputs are blocked (i.e. new input data is waiting for the current data to be processed). In this case, the overclocking technique described above is useful. There are several different ways in which such situations can be detected, for example, it can be done by knowing either the state of the system or the state of the I/O queues (when present), and it will be appreciated by a person skilled in the art that the present invention is not intended to be limited in this regard.

Figure 3:
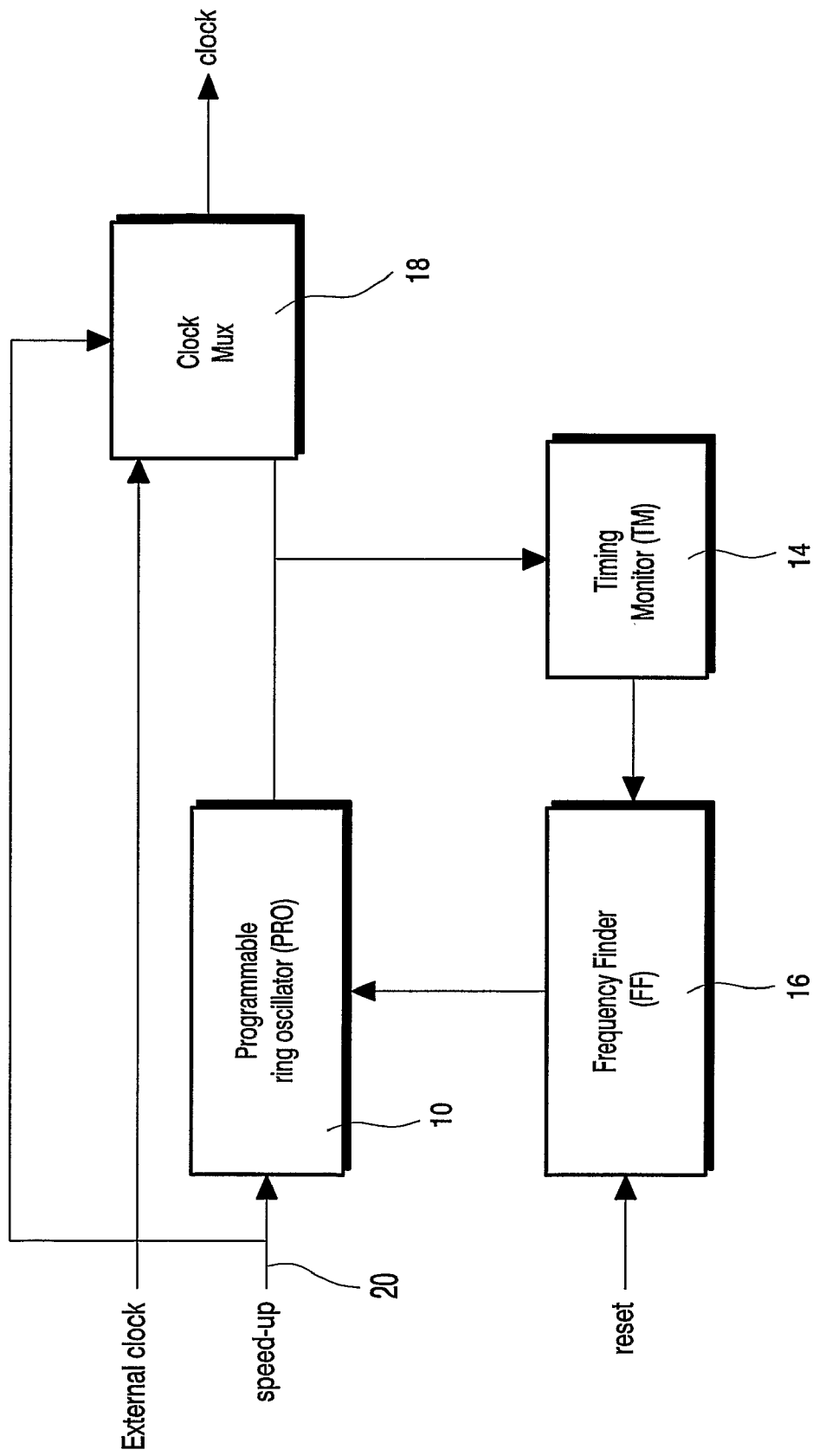
FIG. 3 is a schematic block diagram illustrating apparatus according to a second exemplary embodiment of the present invention.

Referring now to FIG. 3 of the drawings, apparatus according to a second exemplary embodiment of the present invention comprises a programmable ring oscillator 10, a frequency finder 16, a timing monitor 14 and a clock multiplexer (Mux) 18. In this case, the nominal clock frequency is provided to the system from an external source. The arrangement still includes an internal clock oscillator 10, but only to generate the maximum frequency. In this case, therefore, only a frequency finder 16 (as opposed to a frequency finder and selector) is provided, which is used to find the maximum system operating frequency in respect of the internal clock oscillator. A clock multiplexer 18, driven by the 'speed-up' signal 20, is now used after the programmable ring oscillator 10 to select at which frequency the system is required to operate (i.e. the nominal frequency generated by the external clock generator, or the fast one from the internal programmable ring oscillator 10).

Operation of the arrangement of FIG. 3 is similar in most respects as that of the arrangement of FIG. 1, except that the frequency finder 16 only determines the maximum frequency, via the internal ring oscillator 10. It does not program the internal programmable ring oscillator 10 to generate a clock signal at the nominal frequency. Instead, this signal is generated by an external component. Furthermore, in this case, the 'speed-up' signal 20 is applied to the clock multiplexer 18, thereby causing it to switch and cause the clock signal at the maximum frequency, determined by the frequency finder 16 and generated by the programmable ring oscillator 10, to be output, whereas in the arrangement of FIG. 1, the 'speed-up' signal is applied to the frequency finder and selector, which in turn causes the programmable ring oscillator to generate a clock signal at the maximum frequency. The speed up signal could also be sent to the programmable ring oscillator 10 so as to stop it from oscillating when it is not required for use, so as to save power.

Thus, the method and apparatus of the above-described aspect of the present invention provide an automatic and relatively inexpensive way of taking advantage of the fact that many integrated circuits are capable of operating at frequencies much higher than the nominal frequency, and of optimizing use of this fact. The frequency is increased to its maximum only when required, thereby reducing energy waste relative to prior art solutions.

Another aspect of the invention is based on the idea of performing automatic calibration of ring oscillators in a periodic manner and to adapt the ring oscillator, when the system is running, so as to take into account silicon ageing as well as changing working conditions. The generated calibration data is stored into embedded non-volatile memories so as to avoid the necessity of external components and, thus, also allowing to immediately power up the system without the need for an initial calibration or data retrieve step.

Figure 4:
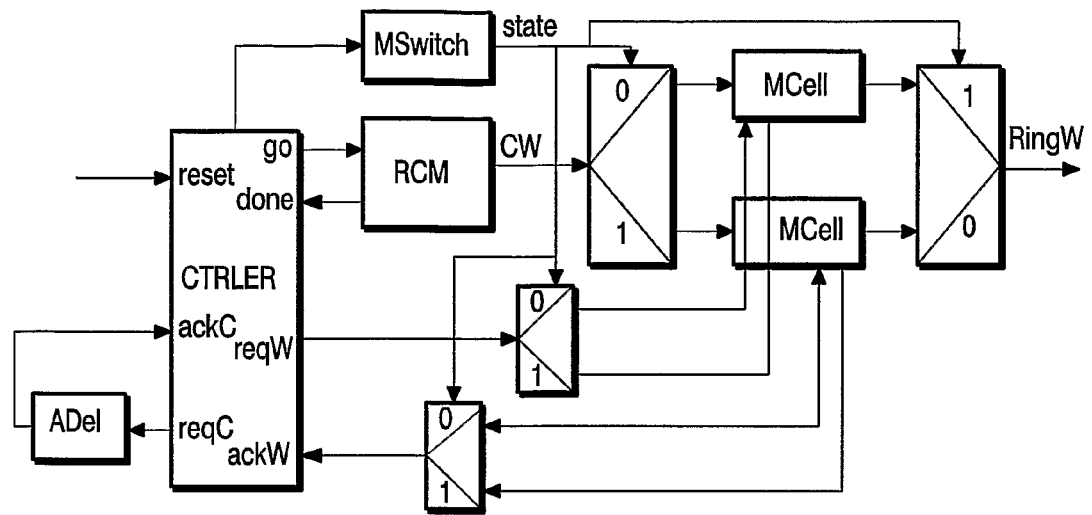
FIG. 4 is a schematic block diagram illustrating apparatus according to a third exemplary embodiment of the present invention.
Figure 5:
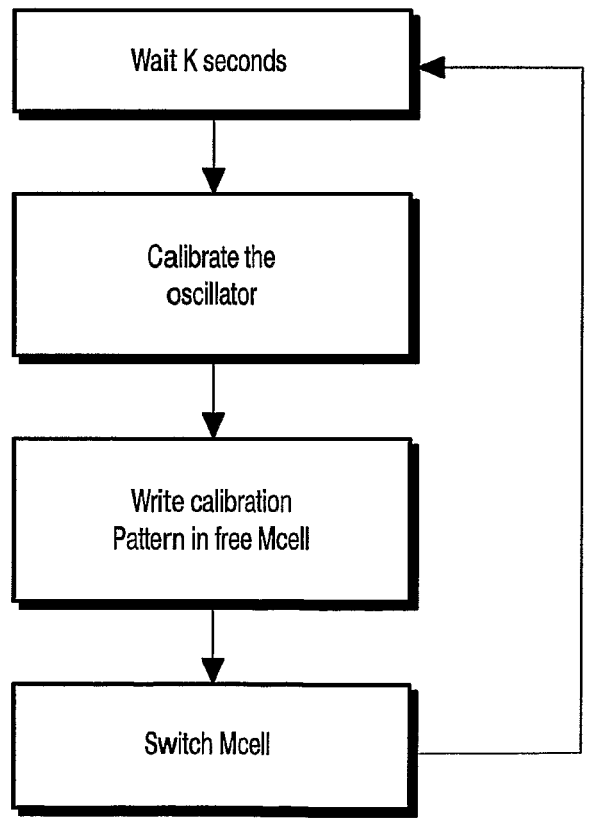
FIG. 5 is a schematic flow diagram illustrating the process flow of the apparatus of FIG. 4.

Referring to FIG. 4 of the drawings, apparatus according to an exemplary embodiment of this aspect of the present invention comprises:

A controller for correct sequencing of actions as described in FIG. 5 (CTRLER in FIG. 4).
An asymmetric delay line for determining the calibration period (ADel in FIG. 4.
A ring calibration module for determining the calibration data (RCM in FIG. 4).
Non-volatile registers built out of (for example) magnetic memory cells (Mcell).
A non-volatile state switch (for example build out of a magnetic memory cell) that changes state (from 1 to 0 and vice versa) every time there is an event (e.g. a transition or a pulse) at its input (Mswitch in FIG. 4).

The embodiment works as illustrated in FIG. 5:

After reset, the system has to wait K seconds before starting a new calibration. In this case, the CTRLER raises signal reqC and waits for askC to be raised. The delay between these events is determined by ADel block.
At this point a new calibration is performed. The CTRLER commands the RCM by means of the go signal to perform a new calibration; the RCM signals the completion of it by means of the done signal.
The new calibration data is now stored in the memory cell that is currently not connected to the output by means of the ReqW/ackW signal pair.
The new calibration data is now sent out (RingW signal) by flipping the state of the Mswitch by means of an even on the flip signal.
The system goes back in the initial waiting state.

Figure 6:
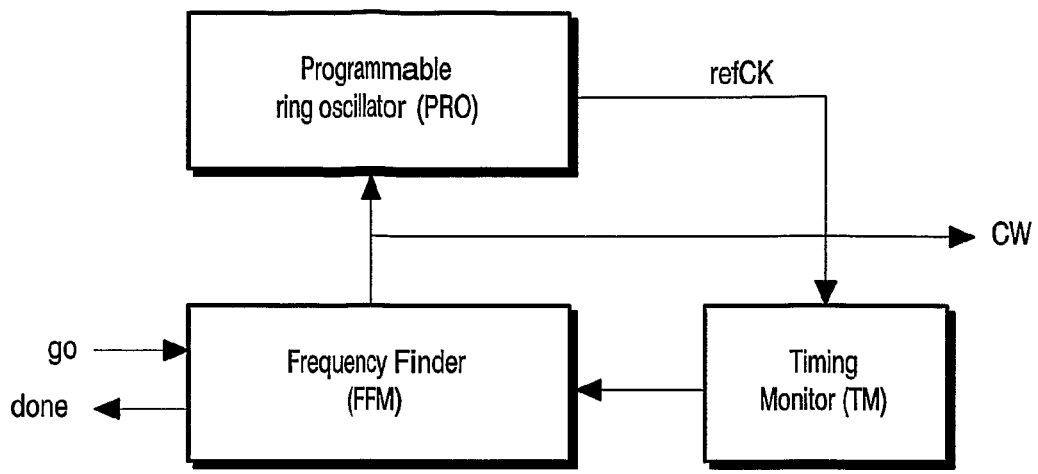
FIG. 6 is a schematic block diagram illustrating an RCM module for use in the apparatus of FIG. 4.
Figure 7:
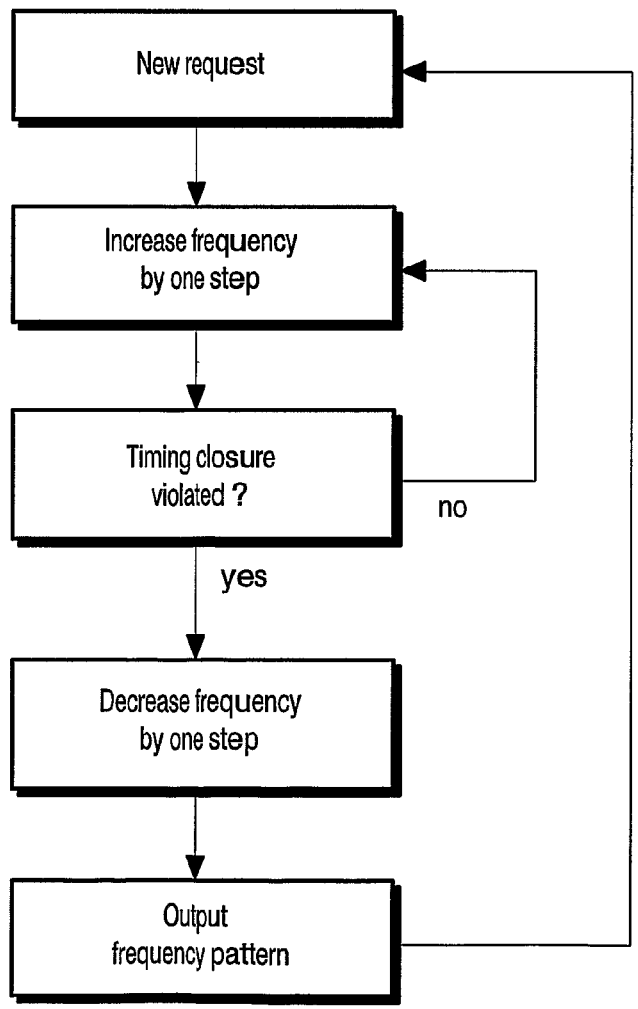
FIG. 7 is a schematic flow diagram illustrating the process flow of the module of FIG. 6.

An exemplary embodiment of the RCM module is illustrated in FIG. 3. Basically, the unit has an internal programmable ring oscillator 10 (that is a copy of the one used to generate the clock for the system), a timing closure monitor 14 (to check if the frequency of the signal at its input violates the design timing constraint) and a frequency finder 12 (that iterates for finding the correct clock frequency). The mode of operation is simple, substantially similar to that described with reference to FIG. 3, and described in more detail with reference to FIG. 6. The frequency finder 12 uses the other two modules to find the maximum possible frequency allowed by the timing constraints (the search can be linear as in FIG. 6, or it could use a different algorithm). This information is the calibration data that is then sent out.

Advantages of this aspect of the invention, include the fact that it is:
Automatic without the requirement for external components, and performed while the system is already running.
Adaptive to working conditions and silicon ageing.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of determining a maximum clock frequency of an operation of a digital processing system, the method comprising:
generating a clock signal at an initial frequency;
increasing said initial frequency in a step-wise manner;
determining the operation of said digital processing system at each of a selected number of frequencies with a timing monitor, until a clock frequency is identified at which said digital processing system does not operate correctly within system timing constraints;
identifying the maximum clock frequency of the operation of said digital processing system; and
using the maximum clock frequency only during a run time when the digital processing system is starving output signals and blocking input signals,
wherein said maximum clock frequency comprises a frequency immediately previous to the clock frequency identified as the clock frequency at which said digital processing system does not operate correctly.

2. The method of claim 1, further comprising:
storing the maximum frequency in a programmable delay element.

3. The method of claim 1, further comprising:
periodically performing the method of claim 1 during the run time.

4. An apparatus that determines a maximum clock frequency of an operation of a digital processing system, the apparatus comprising:
- a programmable ring oscillator that generates a clock signal at an initial frequency;
- a frequency finder and selector that increases the frequency of the clock signal from the initial frequency to the maximum clock frequency in a step-wise manner;
- a timing monitor that determines the operation of said digital processing system at each of a selected number of frequencies, until a clock frequency is identified at which said digital processing system does not operate correctly within system timing constraints, thereby identifying the maximum clock frequency at which said digital processing system can operate correctly;
- wherein the maximum clock frequency is used only during a run time when the digital processing system is starving output signals and blocking input signals, and
- wherein said maximum clock frequency comprises a frequency immediately previous to the clock frequency identified as the clock frequency at which said digital processing system does not operate correctly.

5. A method of selectively changing the frequency at which a digital processing system is operating, the method comprising:
- determining, when said digital processing system is reset, a maximum clock frequency at which said digital processing system can operate within system timing constraints;
- storing said maximum frequency;
- generating, after reset, a clock signal at a nominal frequency, less than said maximum frequency, until a signal is received indicating that an increased clock frequency is required;
- generating, in response to receipt of said signal, a clock signal at said maximum frequency only during a run time when the digital processing system is starving output signals.

6. The method of claim 5, further comprising;
using a bi-section algorithm when determining the maximum clock frequency.

7. An apparatus that selectively changes the frequency at which a digital processing system is operating, the apparatus comprising:
- a programmable ring oscillator that only generates a maximum clock frequency;
- an external source that generates a nominal clock frequency;
- a timing monitor that determines, when said digital processing system is reset, the maximum clock frequency at which said digital processing system can operate within system timing constraints;
- a frequency finder that detects the maximum clock frequency of the programmable ring oscillator; and
- a clock multiplexer that switches between the nominal clock frequency and the maximum clock frequency, using the maximum clock frequency only during a run time when the digital processing system is starving output signals and blocking input signals.

* * * * *